(12) United States Patent
Tsukamoto et al.

(10) Patent No.: US 6,929,180 B2
(45) Date of Patent: Aug. 16, 2005

(54) PERSONAL IDENTIFICATION METHOD AND PERSONAL IDENTIFICATION DEVICE

(75) Inventors: Uhei Tsukamoto, Tokyo (JP); Masuo Enokida, Tokyo (JP); Kyoichiro Hasegawa, Tokyo (JP)

(73) Assignee: S-Staff Corporation, Tokyo (JP)

( * ) Notice: Subject to any disclaimer, the term of this patent is extended or adjusted under 35 U.S.C. 154(b) by 0 days.

(21) Appl. No.: 10/745,373

(22) Filed: Dec. 19, 2003

(65) Prior Publication Data

US 2004/0144841 A1 Jul. 29, 2004

Related U.S. Application Data

(63) Continuation of application No. 10/020,110, filed on Dec. 14, 2001, now abandoned.

(30) Foreign Application Priority Data

Aug. 10, 2001 (JP) ........................................ 2001-244860

(51) Int. Cl.[7] ................................................. G06K 5/00
(52) U.S. Cl. ........................ 235/382; 382/124; 382/125
(58) Field of Search .......................... 235/382; 382/115, 382/125, 124; 707/3

(56) References Cited

U.S. PATENT DOCUMENTS

| | | | |
|---|---|---|---|
| 3,560,928 A | | 2/1971 | Berger et al. |
| 4,135,147 A | | 1/1979 | Riganati et al. |
| 4,185,270 A | | 1/1980 | Fischer II et al. |
| 4,607,384 A | | 8/1986 | Brooks |
| 4,792,226 A | | 12/1988 | Fishbine et al. |
| 5,337,369 A | | 8/1994 | Shibuya |
| 5,926,555 A | | 7/1999 | Ort et al. |
| 6,047,282 A | * | 4/2000 | Wilson et al. ............... 707/3 |
| 6,091,839 A | | 7/2000 | Uchida |
| 6,173,068 B1 | | 1/2001 | Prokoski |
| 6,181,808 B1 | * | 1/2001 | Fukuzumi .................. 382/126 |
| 6,567,539 B1 | | 5/2003 | Benezeth |

FOREIGN PATENT DOCUMENTS

| | | | | |
|---|---|---|---|---|
| JP | 5-189546 | | 7/1993 | |
| JP | 2000-148982 | | 5/2000 | |
| WO | WO 99/31620 | * | 6/1999 | ............ G06K/9/00 |

* cited by examiner

*Primary Examiner*—Daniel Stcyr
*Assistant Examiner*—Daniel A. Hess
(74) *Attorney, Agent, or Firm*—Pearne & Gordon LLP

(57) ABSTRACT

The invention offers a technique for personal identification which reduces the amount of computation required to match fingerprints, thereby shortening the processing time, while simultaneously improving the precision of the match. A press-type fingerprint sampler 1 reads a 1 $cm^2$ area in the central portion of a fingerprint which has been pressed flat, and supplies fingerprint information representing a two-dimensional image of the fingerprint to a fingerprint match processing device 2. At the fingerprint match processing device 2, a minutiae extracting portion 21b extracts eight types of minutiae (starting points, end points, bifurcation points, juncture points, dots, short lines, islands and scars) from the fingerprint information and writes these into the memory portion 22 to register the fingerprint. When matching the fingerprints, the fingerprints are similarly sampled by the press-type fingerprint sampler 1 to extract the minutiae, which are then supplied to a match computing portion 21c. Additionally, a control computation processing portion 21a reads the minutiae of the registered fingerprint and supplies them to a match computing portion 21c. As a result, the match computing portion 21c compares the minutiae of the sampled fingerprint and the minutiae of the registered fingerprint to determine whether or not they are the same.

2 Claims, 9 Drawing Sheets index finger → middle finger → ring finger → little finger → thumb

PERSONAL IDENTIFICATION METHOD AND PERSONAL IDENTIFICATION DEVICE

This application is a continuation of application Ser. No. 10/020,110 filed on Dec. 14, 2001, now abandoned.

BACKGROUND OF THE INVENTION

The present invention relates to a personal identification technology for identifying individuals by matching of dermatoglyphic patterns such as fingerprints.

The need for personal identification technologies for identifying specific individuals has increased in various fields involving key or ID-based security and personal verification by passwords or identification codes. Since conventional personal identification techniques tend to make extensive use of specific keys or identification numbers as means for personal identification, they must always be wary of the possibility of duplication or illicit modification, and must also take into consideration the problems which may be caused by the loss of the means of personal identification (such as loss of keys or forgetting of identification numbers). In contrast, the characteristics of fingerprints are highly individual, with no two persons having exactly the same fingerprint, so that in recent years, the use of fingerprints as means of personal identification has aroused considerable interest, and personal identification technologies for identifying a single individual by means of fingerprint matching are being developed for entry into common practice.

Personal identification by means of fingerprint matching is a system, conventionally known as dactyloscopy, whose use has traditionally been reserved for identifying suspects in forensic criminal investigations by the police and similar investigative organizations, and the recent trend toward more mainstream use of such personal identification technologies is based on this past legacy. In fingerprint matching, all fingerprints can be largely divided into five different types of patterns (arch, loop, whorl, variant and scarred), but the simple division into these patterns cannot be considered to be sufficient for unique identification. Therefore, in forensic dactyloscopy, the detailed features or minutiae of fingerprints are taken into consideration to make comparative analyses, and the collecting of such minor features has been held to be essential also to the recent personal identification systems which have been offered as an alternative to keys and passwords in recent years.

As conventional art relating to this type of fingerprint matching, Japanese Patent Application, First Publication No. 2000-148982 discloses a fingerprint matching device for obtaining fingerprint data under constant conditions by fixing the position of the finger to put the fingerprint square against a fingerprint-reading camera. Additionally, Japanese Patent Application, First Publication No. H5-189546 discloses a device for determining whether or not a subject is valid by extracting two types of minutiae, that is, terminal points (where the ridge of a fingerprint ends) and bifurcations (where the ridge of a fingerprint divides), from the fingerprint image.

The fingerprint matching systems currently used by the Japanese police force work under the assumption that the fingerprints will be collected from those left by suspects at a crime scene. Since the latent fingerprints collected at crime scenes can be incomplete and are often only obtained as partial fingerprints (small parts of the fingerprint) corresponding to arbitrary parts of the fingers coming into contact with objects, it is necessary to take a wide range of fingerprints so as to be able to match them against any portion of the fingerprint. Therefore, when fingerprinting suspects or the like, the subject is made to rotate the finger over the paper over a range of at least 180° in order to capture as many features as possible. When performing the match, the gathered latent fingerprints are collated with registered fingerprints using a computer in order to electronically sort them based on the minutiae, and this is followed by a naked-eye comparison.

However, since the registered fingerprints cover a wide area and contain numerous minutiae, the computational power required for collation with latent fingerprints must necessarily be vast. Moreover, the taking of fingerprints by rotation as described above can cause fingerprints to be difficult to reconstruct due to the frequent occurrence of smudging and smearing of the fingerprints when taking the fingerprints (due to the elasticity of the fingerprints). That is, since the shape of a fingerprint depends on the force applied in the vertical and horizontal directions when taking the fingerprint, a latent fingerprint may sometimes not be recognized by electronic sorting to be the same as the registered fingerprint of the same person (the same finger) if there is a difference in the way in which the force is applied. Due to this reason, the above-described sorting by computers involves a large amount of computation and takes a lot of time, while still having relatively low precision during collation (as a result, most matching is actually dependent on human judgment).

Additionally, the personal identification techniques of recent years which are based on forensic fingerprint matching have the similar problems of requiring a lot of processing time yet having low precision, and a solution has been sought. In contrast, the fingerprint matching device disclosed in the above-mentioned Japanese Patent Application, First Publication No. 2000-148982 attempts to control the deformation or displacement of fingerprints by obtaining fingerprint data under identical conditions, but offers no solution for the large processing quantities. Additionally, not only is the structure such as to require a rotary mechanism to rotate the fingerprint-reading camera, but it also reads the finger (fingerprint) with the fingerprint-reading camera with the finger held in the air, and therefore requires a complex image processing capability in order to allow the fingerprint to be obtained as two-dimensional image data that is suitable for making comparisons. On the other hand, since the device disclosed in the above-mentioned Japanese Patent Application, First Publication No. H5-189546 considers only the validity of individual minutiae, the above-described processing time and sorting precision are not affected. Thus, the current personal identification technologies that use fingerprint matching do not offer a complete solution to the large amount of processing required of computers and the inadequacies in matching precision, so that there are no accurate and convenient personal identification systems.

BRIEF SUMMARY OF THE INVENTION

The present invention has been made in view of these considerations, and has the object of offering a personal identification system that is capable of reducing the amount of computation required to match dermatoglyphic patterns such as fingerprints so as to shorten the processing time, and is at the same time capable of improving the precision of the match.

Additionally, the present invention has the object of achieving a suitable means for performing such personal identification with a simple and inexpensive structure, and readily performing quick and precise personal identification by matching of dermatoglyphs.

Furthermore, the present invention has the object of offering a reliable and safe personal identification technique with personal identification means which make full use of the properties of dermatoglyphs such as fingerprints which are completely unique to make it effectively impossible to duplicate or modify, which has conventionally been considered to be a problem in personal identification technologies.

In order to achieve these objects, the personal identification method of the present invention comprises predetermining a standard range of a dermatoglyph containing a number of minutiae necessary to uniquely identify an individual; and identifying the individual based on the dermatoglyph of the standard range. Additionally, the personal identification method of the present invention comprises sequentially sampling dermatoglyphs from a plurality of locations on the body of an individual; and identifying a subject as being the same as the individual if the subject presents the same dermatoglyphs from the same plurality of locations in the same order as they were sampled.

A more specific personal identification method according to the present invention comprises a first step of sampling a dermatoglyph over a predetermined standard range containing a number of minutiae necessary to uniquely identify an individual, and extracting and recording the minutiae from the sampled dermatoglyph; a second step of sampling a dermatoglyph of an unidentified subject over the predetermined range and extracting the minutiae from the sampled dermatoglyph; and a third step of comparing the minutiae recorded in the first step and the minutiae extracted in the second step, and determining whether or not the dermatoglyph sampled in the first step and the dermatoglyph sampled in the second step are the same. The unidentified subject is identified as being the individual whose dermatoglyph was sampled in the first step if the dermatoglyph sampled in the first step and the dermatoglyph sampled in the second step are found to be the same.

Additionally, another more specific personal identification method according to the present invention comprises a first step of sequentially sampling dermatoglyphs over a predetermined standard range containing a number of minutiae necessary to uniquely identify an individual from a plurality of locations on the individual, and extracting and recording the minutiae from the sampled dermatoglyphs. Further, a second step of sampling a dermatoglyph over the predetermined range on an unidentified subject, and extracting minutiae from the sampled dermatoglyph, and a third step of comparing the minutiae recorded in the first step and the minutiae extracted in the second step, and determining whether or not the dermatoglyph sampled in the first step and the dermatoglyph sampled in the second step are the same, with respect to dermatoglyphs sequentially presented by the unidentified subject, with the minutiae of the dermatoglyphs sampled in the first step being used as the object of comparison in the third step in the same order as the order in which they are presented are performed, these second and third steps being repeated. That is, the dermatoglyphs presented by the unidentified subject and the dermatoglyphs for which the minutiae were stored in the first step are sequentially compared such that each dermatoglyph sequentially presented by the unidentified subject is compared, among the dermatoglyphs of the plurality of locations sampled in the first step, with the one which corresponds in the order in which they were sampled. The unidentified subject is identified as being the individual whose dermatoglyphs were sampled in the first step if the dermatoglyphs sequentially sampled in the first step and the dermatoglyphs sequentially sampled in the second step are all found to be the same.

On the other hand, a personal identification device according to the present invention comprises sampling means for sampling a dermatoglyph over a predetermined standard range containing a number of minutiae necessary to uniquely identify an individual; extracting means for extracting minutiae from the dermatoglyphs sampled by the sampling means; memory means for recording minutiae information extracted by the extracting means for a registrant whose dermatoglyph has been previously sampled and registered by the sampling means; and determining means for determining whether or not the dermatoglyph of the registrant is the same as the dermatoglyph of an unidentified subject by comparing minutiae information extracted by the extracting means from the dermatoglyph of the unidentified subject sampled by the sampling means and the minutiae information recorded by the memory means. The unidentified subject is identified as being the same individual as the registrant when the dermatoglyph of the registrant and the dermatoglyph of the unidentified subject are found to be the same by the determining means.

Additionally, another personal identification device according to the present invention comprises sampling means for sampling a dermatoglyph over a predetermined standard range containing a number of minutiae necessary to uniquely identify an individual; extracting means for extracting minutiae from the dermatoglyphs sampled by the sampling means; memory means for recording minutiae information of dermatoglyphs of a plurality of locations extracted by the extracting means from a registrant who has sequentially sampled and registered dermatoglyphs of the plurality of locations by the sampling means; and determining means for comparing the minutiae information extracted by the extracting means from the dermatoglyphs of an unidentified subject sampled by the sampling means and minutiae information stored in the memory means, and determining whether or not the dermatoglyphs of the registrant are the same as the dermatoglyphs of the unidentified subject, wherein the minutiae information extracted from the dermatoglyphs sequentially presented by the unidentified subject are compared with minutiae information of the dermatoglyphs of the registrant sampled by the sampling means read out from the memory means in the same order as the dermatoglyphs are presented. The unidentified subject is identified as being the same individual as the registrant when the dermatoglyphs sequentially sampled by the registrant and the dermatoglyphs sequentially sampled by the unidentified subject are found to be the same by the determining means. That is, the dermatoglyphs (minutiae information) presented by the unidentified subject and the dermatoglyphs (minutiae information) for which the minutiae were stored in the first step are sequentially compared such that each dermatoglyph sequentially presented by the unidentified subject is compared, among the dermatoglyphs of the plurality of locations sampled in the first step, with the one which corresponds in the order in which they were sampled.

Here, the extracting means may be such as to extract starting points, end points, bifurcation points, juncture points, dots, short lines, islands and scars as minutiae. Additionally, the standard range may be a 1 cm$^2$ area in the central portion of a dermatoglyph. By taking starting points, end points, bifurcation points, juncture points, dots, short lines, islands and scars as the minutiae, at least 12 minutiae will be contained in a 1 cm$^2$ area in the central portion of a dermatoglyph such as a fingerprint. These 12 minutiae are the number of minutiae required to uniquely identify a person.

Furthermore, the sampling means may comprise image acquiring means for acquiring an image of a dermatoglyph; and fixing means for fixing the position of the standard range of the dermatoglyph in an image acquiring area of the image acquiring means. In this case, the fixing means may comprise a transparent member onto one side of which the dermatoglyph is pressed so as to be visible to the image acquiring means from the opposite side; or an ex-dermatoglyphic member for pulling the skin outside the standard range of the dermatoglyph, thereby making the flatly extended dermatoglyph to the image acquiring means.

DETAILED DESCRIPTION OF THE INVENTION

Basic Structure

Figure 1:
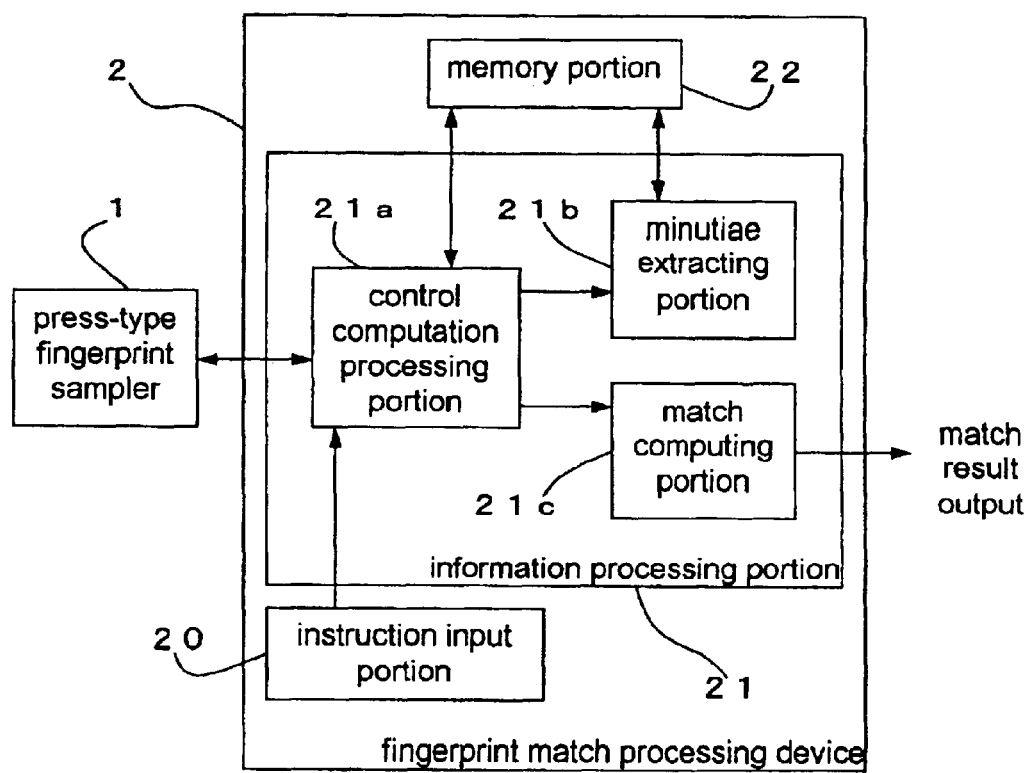
FIG. 1 is a diagram showing the basic structure of a personal identification device according to an embodiment of the present invention.

Herebelow, an embodiment of the present invention shall be explained with reference to the drawings. FIG. 1 is a drawing showing the basic structure of a personal identification device according to an embodiment of the present invention. This personal identification device is composed of a press-type fingerprint sampler 1 and a fingerprint match processing device 2 as shown, such that the fingerprint is taken with the press-type fingerprint sampler 1 and the registration and collation of the fingerprint is performed by the fingerprint match processing device 2, which then outputs the results of the match (personal identification results).
(1) Structure of Press-type Fingerprint Sampler The press-type fingerprint sampler 1 is a fingerprint sampling means for taking the fingerprints over a predetermined standard range, having a predetermined fingerprint sampling surface on which the finger (fingerprint) of a person whose fingerprint is to be registered or matched is pressed, for sampling the above-described standard range of the fingerprint which has been pressed and flattened on the fingerprint sampling surface. The standard range described here is the range of area on the fingerprint containing a sufficient number of minutiae to identify an individual by means of fingerprint matching, that is, the range enabling extraction of the number of minutiae which are theoretically needed for unique personal identification. This range is determined from experience or experiment in such a way as to cover an area which is considered to be necessary in order to contain at least the above-mentioned number of minutiae at the portion of the fingerprint being sampled.

Figure 2:
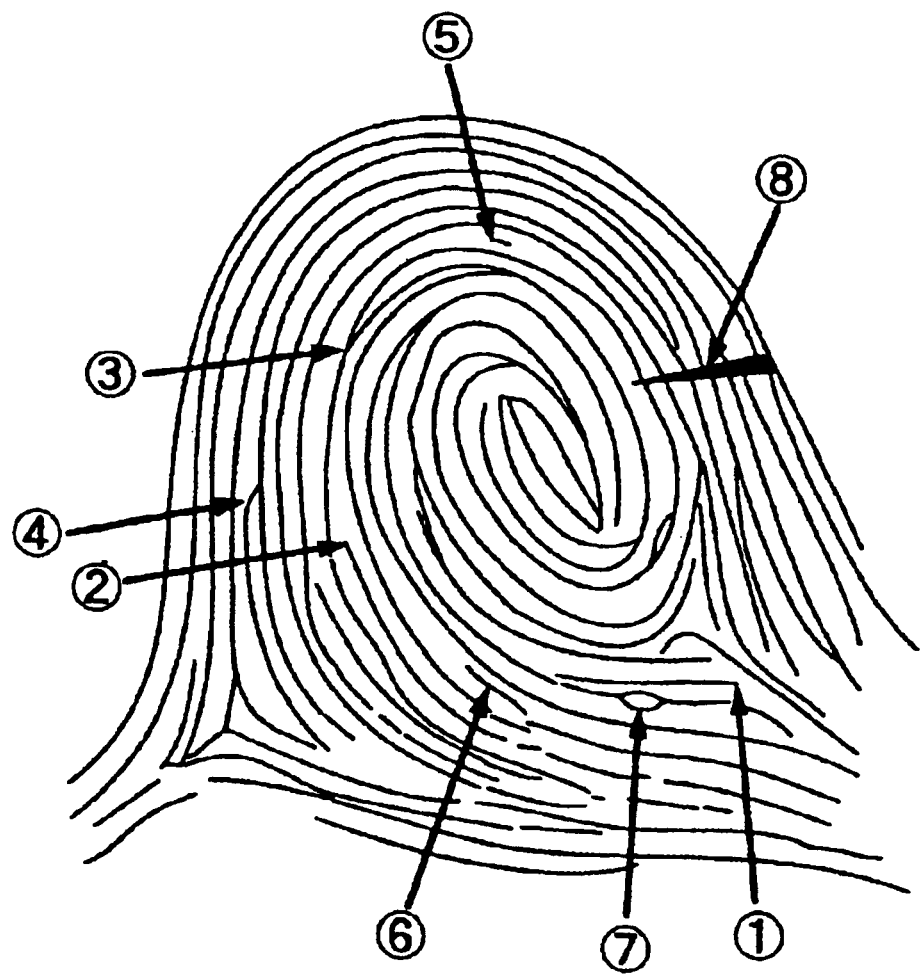
FIG. 2 is a diagram showing examples of the minutiae of a fingerprint.

While endpoints and bifurcations of ridges are generally used as minutiae of fingerprints in this case, the present embodiment uses minutiae other than these two types, and instead uses the eight types of minutiae shown in FIG. 2. The meanings of these minutiae are as follows.

(a) Starting Point: Terminal point from which a ridge originates in the clockwise direction.
(b) End Point: Terminal point at which a ridge ends in the clockwise direction.
(c) Bifurcation Point: Point where a ridge divides from one to two in the clockwise direction.
(d) Juncture Point: Point where two ridges join to form one in the clockwise direction.
(e) Dot: Isolated raised point not associated with other ridges.
(f) Short Line: A point representing a short ridge.
(g) Island: Island type pattern formed by a bifurcating ridge returning to join the original ridge.
(h): Scar: Permanent scar left by wound.

In order to treat (6) short lines, (7) islands and (8) scars as minutiae with specific positions, it is sufficient to use interior points, center points, midpoints, or boundaries with surrounding features.

The eight types of minutiae mentioned above are present at specific locations on the dermatoglyphs (bodily prints) including fingerprints of all people, and personal identification can be performed with extremely high accuracy by collating their distribution and arrangement or combination. When totaling all eight types of minutiae described above, a single human fingerprint has an average of about 100 minutiae, and about 1 minutia will match among 10 fingerprints (10 fingers). Thus, the number of minutia theoretically required for unique identification is considered in this embodiment to be 12. That is, $10^{12}$=one trillion fingers would be required to obtain a match of 12 minutiae, and even if this number is divided by the number of fingers per person, i.e. 10, this is still 100 billion people. That is, the chances for two separate people to have all 12 minutiae matching in any one of their fingers would be even only if there were 100 billion people in the world, but since this number of 100 billion is much larger than the current population of the world which is 6.5 billion, it is believed to be sufficient to match 12 points in order to make a unique identification. This view that 12 points is enough is based on statistical studies which have already been established in the field of forensics, so that not only the Japanese police, but also most of the police worldwide, such as the United States' FBI (Federal Bureau of Investigation) employ a 12-point matching system for unique identification.

Additionally, as a result of experimental evaluations on minutiae present on fingerprints performed by the inventors, it was found that when using at least 8 types of minutiae, it is easily possible to extract at least 12 points from an area measuring only 1 $cm^2$ at the center of the fingerprint, no matter how few minutiae a person has. Here, this area of 1 $cm^2$ in the central portion of the fingerprint is an area of 1 $cm^2$ centered at a point (on the side opposite the fingernail) corresponding to the midpoint in the horizontal direction of the baseline of the fingernail. Based on these experimental results, the present embodiment takes a small area of 1 cm² at the central portion of the fingerprint as the fingerprint area containing at least 12 minutiae (the number of minutiae theoretically required).

(2) Detailed Structure of Press-type Fingerprint Sampler

The detailed structure of a press-type fingerprint sampler 1 based on the above-described concepts is shown in FIG. 1. As shown in the drawing, the press-type fingerprint sampler 1 comprises a fingerprint receiving member 10 having an approximate U shape with a lateral cross-section that becomes smaller towards the bottom, and a fingerprint reader 11 facing the fingerprint receiving member 10 so as to read the slightly smaller bottom side.

Figure 4:
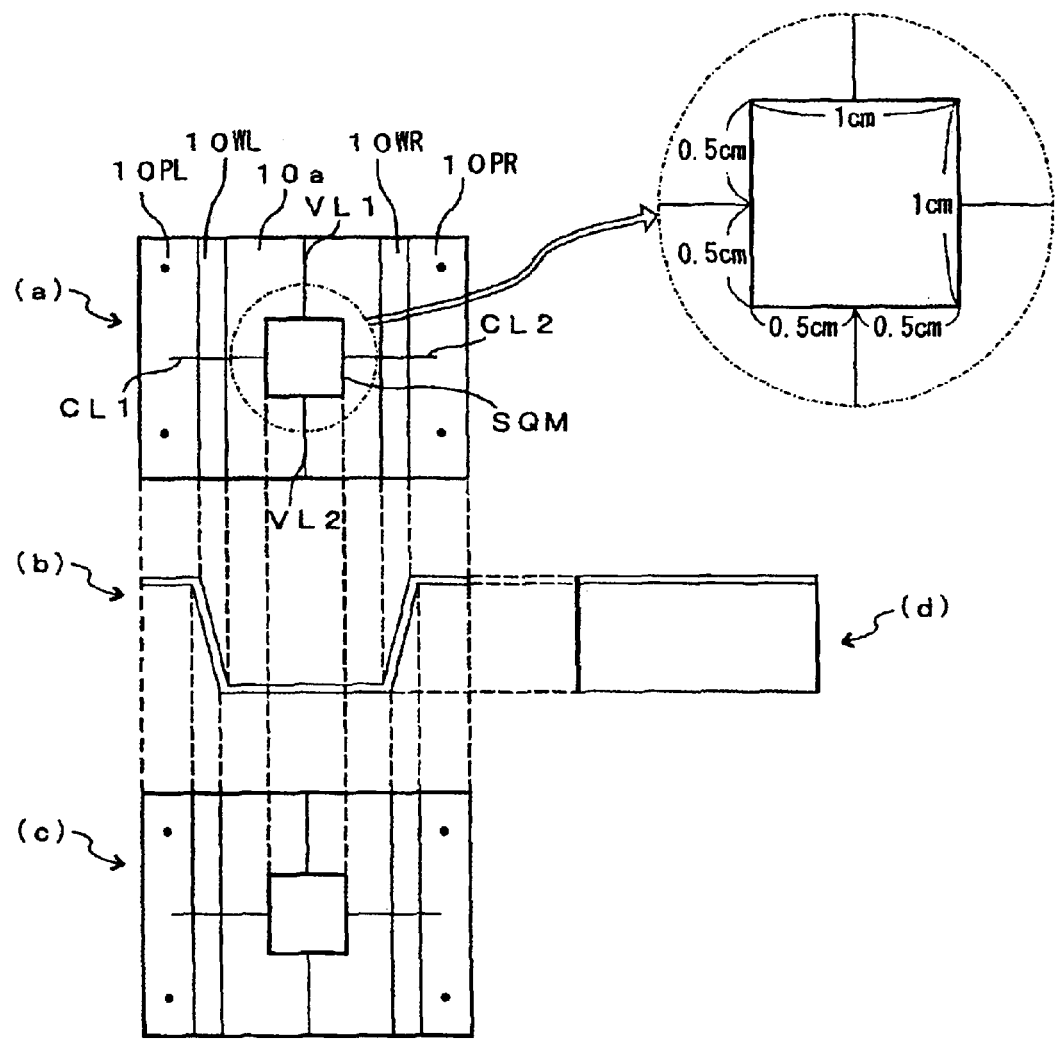
FIG. 4 is a diagram showing the detailed structure of the fingerprint receiving member 10 in FIG. 3.

The fingerprint receiving member 10 is composed of transparent parts such as transparent acrylic panels or the like which are bonded or molded together, a square mark SQM with an area of 1 cm² being visible on the bottom receiving portion transparent panel 10a, such as to allow a finger to be moved downward through the open portion at the top side and the fingerprint to be pressed down on the receiving portion transparent panel 10a at a position such that the central portion of the fingerprint lies on the square mark SQM. FIG. 4 shows a top view (a), front view (b), bottom view (c) and right side view (d) (with the dashed lines indicating the corresponding parts of each view) of the fingerprint receiving member 10 (the rear view is identical to the front view (b), and the left side view is identical to the right side view (d)). As is shown also in these drawings, the fingerprint receiving member 10 has side wall panels 10WL, 10WR which extend upwards with a slight outward tilt respectively from the left and right side edges of the receiving portion transparent panel 10a, with horizontal panels 10PL, 10PR extending laterally and parallel to the receiving portion transparent panel 10a at the top ends of the side wall panels 10WL, 10WR. Due to this structure, the lateral width of the portion in which the finger is placed is at first relatively wide and becomes gradually thinner, with the receiving portion transparent panel 10a which is the portion on which the fingerprint is pressed being slightly thinner in the lateral direction than the open portion. The square mark SQM is provided at the central portion of the receiving portion transparent panel 10a, and as shown in the enlarged view at the top right hand side of FIG. 4, has visible vertical lines VL1, VL2 and horizontal lines CL1, CL2 which are drawn from the midpoints (0.5 cm positions) of the respective sides.

Figure 3:
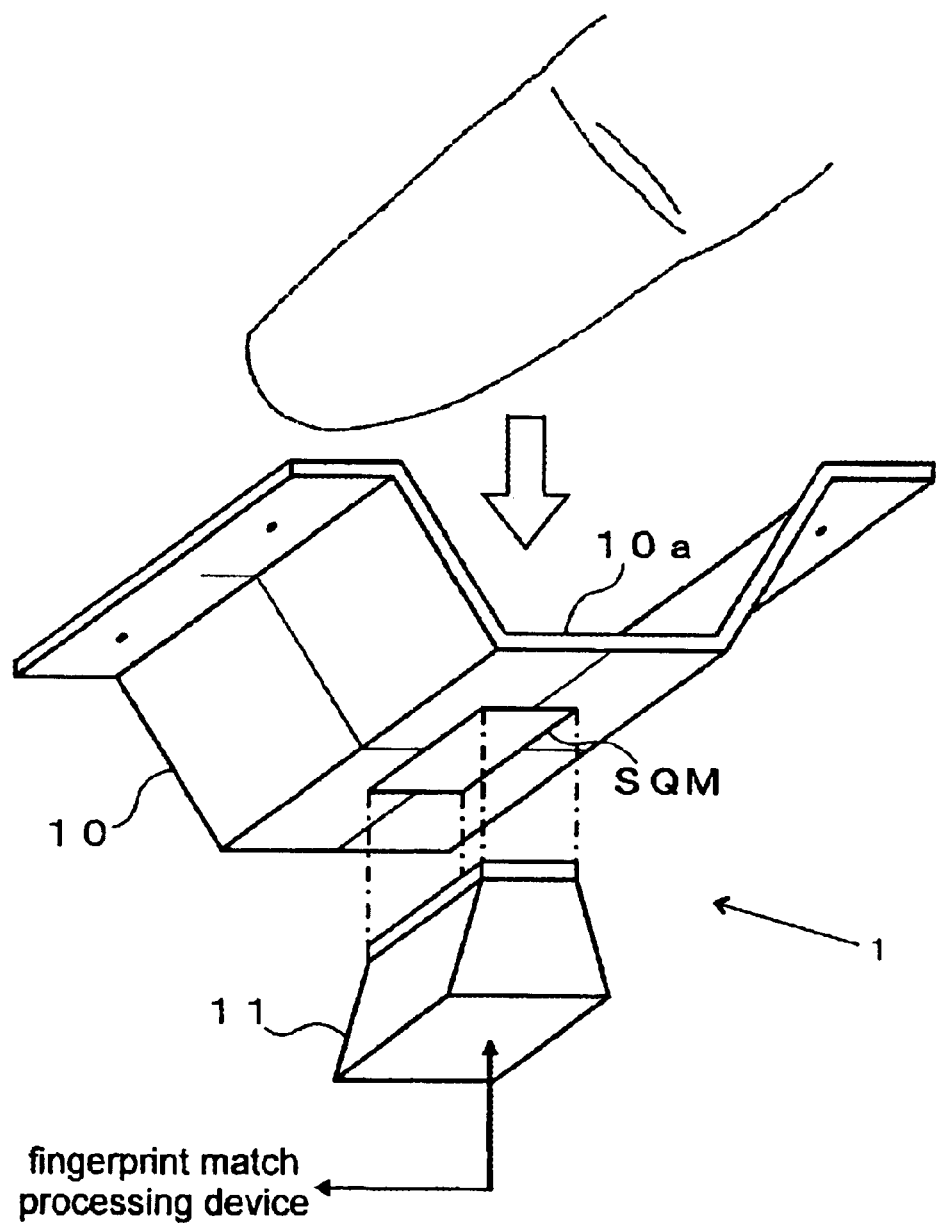
FIG. 3 is a diagram showing a specific structural example of the press type fingerprint sampler 1 of FIG. 1.

Additionally, the fingerprint reader 11 of FIG. 3 is positioned such that the area of the square mark SQM forms the reading area, so as to take a two-dimensional image of the pressed and flattened fingerprint through the receiving portion transparent panel 10a. That is, the press-type fingerprint sampler 1 formed of this fingerprint reader 11 and fingerprint receiving member 10 has the fingerprint receiving surface (top surface) of the receiving portion transparent panel 10a as the fingerprint sampling plane, and takes a picture of the fingerprint with the standard range of fingerprint sampling being the area of 1 cm² within the square mark SQM. The fingerprint reader 11 supplies fingerprint information representing a two-dimensional image of the fingerprint to the fingerprint match processing device 2 of FIG. 1. Here, the receiving portion transparent panel 10a is a transparent member, and the reading of fingerprints (from the reverse side of the fingerprint receiving surface) can be performed using any image reading format, so that the fingerprint reader 11 may, for example, be composed of a CCD camera connected to the fingerprint match processing device 2. In this case, while the fingerprint image data taken by the CCD camera is acquired as fingerprint information, the operation of the CCD camera may be controlled from the fingerprint match processing device 2.

Since fingerprints are composed of complex ridges that are very fine, measuring 0.10–0.20 mm across, an image reading means with sufficient resolution to capture these ridges must be used as the fingerprint reader 11. By providing an optical element such as a magnifier between the square mark SQM and the fingerprint reader 11 depending on the capabilities of the fingerprint reader 11, sufficient resolution can be obtained for the fingerprint ridges. In the present embodiment, the standard range of acquisition of fingerprints is restricted to a small region of 1 cm², so that even if the fingerprint image is taken at a high resolution, the data size of the image will not be too large.

(3) Structure of Fingerprint Match Processing Device 2

On the other hand, the fingerprint match processing device 2 comprises an instruction input portion 20, an information processing portion 21 and a memory portion 22 as shown in FIG. 1, and performs registration and matching of fingerprint samples by processing the fingerprint information supplied from the press-type fingerprint sampler 1.

The instruction input portion 20 is an input means for inputting instructions relating to registration or matching operations to the information processing portion 21 from outside, and is composed of predetermined buttons or a keyboard for receiving inputs from an operator (the person performing the fingerprint registration or matching). The information processing portion 21 is an information processing means such as an electronic computer comprising computation means for controlling the internal information processing and exchange of information with external sources, memory means composed of a semiconductor memory which may be a non-volatile memory such as a ROM or a RAM which stores information in rewritable form, and control means for controlling the internal operations, and may be a computer or the like loaded with a program for performing the respective processing operations (to be explained) of the personal identification device. This information processing portion 21 comprises a control computation processing portion 21a, a minutiae extracting portion 21b and a match computing portion 21c achieved by the computation means and the like by the program arranged in a structure specific to a personal identification device.

The control computation processing portion 21a is a main computation processing portion for controlling the operation of the information processing portion 21 in accordance with the instructions inputted from the instruction input portion 20, receiving fingerprint information supplied from the press-type fingerprint sampler 1, and processing it in a predetermined manner as needed, then supplying the result to the minutiae extracting portion 21b. Additionally, the control computation processing portion 21a writes data to the memory portion 22 and reads data from the memory portion 22, and during the fingerprint match, supplies data read from the memory portion 22 to the match computing portion 21c. The minutiae extracting portion 21b receives fingerprint information from the control computation processing portion 21a, extracts the minutiae and writes them into the memory portion 22. Here, the minutiae extracting portion 21b extracts all eight types of minutiae described above, and writes the type and position of each extracted minutia into the memory portion 22 as minutiae data. The match computing portion 21c performs a fingerprint match computation (comparison of minutiae data) based on the data (minutiae data) supplied form the control computation processing portion 21a and minutiae extracting portion 21b, then outputs the results. The specific procedures performed by the control computation processing portion 21a, minutiae extracting portion 21b and match computation portion 21c shall be described in more detail below.

The memory portion 22 is a memory means for registering (storing) data such as minutiae of the fingerprint samples taken by the press-type fingerprint sampler. When the information processing portion 21 is composed of a computer or the like, this memory portion 22 can be composed of an internal memory device such as a hard disk internal to the computer, or may be an external memory device connected to the computer as a peripheral device.

Operation

In the above structure, the personal identification device registers fingerprints beforehand and collates them with fingerprint samples which have been taken later, thereby to perform personal identification to determine whether or not the person whose fingerprint has been sampled is the same person as one who has already registered a fingerprint.

(1) Fingerprint Registration

Figure 5:
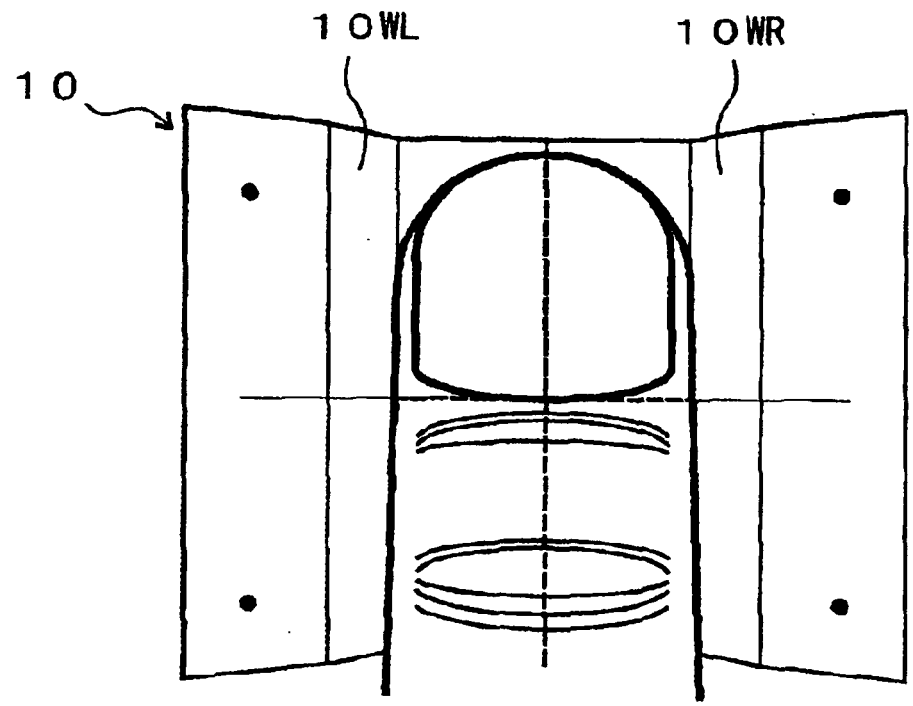
FIG. 5 is a diagram showing how a fingerprint is sampled with the press type fingerprint sampler of FIG. 3.

When registering a fingerprint, a registration start instruction is inputted from the instruction input portion 20 of the fingerprint match processing device 2, and at the press-type fingerprint sampler 1, a person whose fingerprint is to be registered enters a finger at the open portion of the fingerprint receiving member 10 as shown in FIG. 5 to bring the fingerprint close to the receiving portion transparent panel 10a (without applying excessive force or rotating).

In this case, in the fingerprint receiving member 10, horizontal lines CL1 and CL2 are drawn outwards from the midpoints of the right and left sides of the square mark SQM, so that the base of the fingernail can be positioned in alignment with the horizontal lines CL1 and CL2 (so as to make the baseline of the fingernail roughly co-linear with the horizontal lines CL1 and CL2). Additionally, since the vertical lines VL1, VL2 are drawn outwards from the midpoints of the top and bottom sides of the square mark SQM, the center of the finger in the lateral direction is placed on these vertical lines VL1 and VL2 as indicated by the vertical dashed lines in FIG. 5 (for example, the center of the tip portion of the nail can be placed over the vertical lines VL1 and VL2). As a result, the corresponding point on the fingerprint side at the center in the horizontal direction of the base of the nail, that is, the center of the fingerprint, is positioned so as to be aligned with the center of the square mark SQM, enabling the 1 cm$^2$ at the central portion of the fingerprint to be positioned over the square mark SQM when the fingerprint is placed on the receiving portion transparent panel 10a.

Furthermore, since the fingerprint receiving member 10 is slightly wider in the lateral direction at the open portion and becomes slightly thinner at the receiving portion transparent panel 10a, the lateral position of the finger is guided toward the center by the side wall panels 10WL and 10WR when the finger is placed in the open portion. As a result, positional displacements in the lateral direction are forcibly suppressed in addition to positioning on the vertical lines VL1 and VL2 as described above, so as to be able to position the area of 1 cm$^2$ at the center of the fingerprint more precisely within the square mark SQM.

As the lateral position of the finger is guided toward the center by the side wall panels 10WL and 10WR, this structure in which the open portion is at first rather wide and becomes thinner at the receiving portion transparent panel 10a causes the right and left side surfaces of the finger to rub against the side wall panels 10WL and 10WR, and the frictional force causes the fingerprint to be pulled slightly in the direction of the nails. As a result, the skin of the fingers is pulled taut so as to eliminate displacement of the minutiae due to wrinkles or resilience of the finger and fingerprint, so that the fingerprint is spread flat upon reaching the receiving portion transparent panel 10a (when pressed) and clearly showing the minutiae.

When taking fingerprint samples, positional displacement can be a serious problem, and in order to ensure theoretical precision, great care is required to prevent positional displacement. In the present embodiment, the structure of the fingerprint receiving member 10 enables positional displacement as described above to be prevented, makes the minutiae of the fingerprints stand out, and enables the finger to be fixed at a standard position to align the area of 1 cm$^2$ at the central portion of the fingerprint easily and suitably with the position of the square mark SQM.

Figure 6:
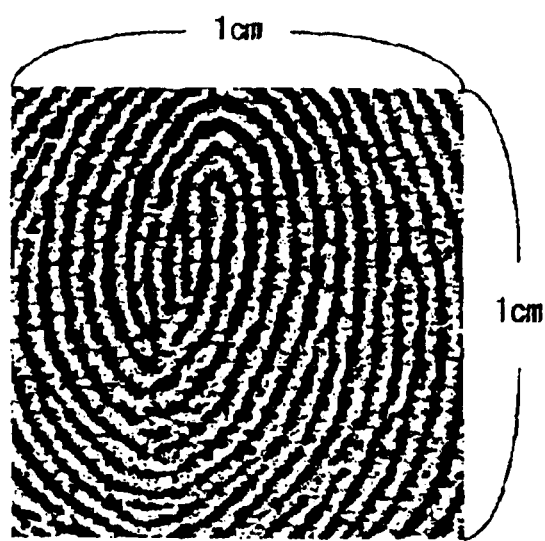
FIG. 6 is a diagram showing an example of a fingerprint taken by the press type fingerprint sampler 1 of FIG. 3.

When the fingerprint is held motionless in a state of positional alignment and pressed down onto the receiving portion transparent panel 10a, the fingerprint in the area of 1 cm$^2$ in the central portion inside the square mark SQM is taken as a sample by the fingerprint sampler 11 as shown in FIG. 6. Fingerprint information representing a two-dimensional image of the fingerprint sampled (read) in this way is supplied to the fingerprint match processing device 2, and at the information processing portion 21 which has received the above-described instruction input to start registration from the instruction input portion 20, the supplied fingerprint information is taken into the control computation processing portion 21a.

The control computation processing portion 21a supplies the received fingerprint information to the minutiae extracting portion 21b, but may process it in a predetermined way if needed. Here, the predetermined process performed by the control computation processing portion 21a is a process for converting the fingerprint information supplied as image data into an information format that is suited to extraction of the above described eight types of minutiae, and can be appropriately determined according to the image reading format of the fingerprint sampler 11, output data format and minutiae extraction format of the minutiae extracting portion 21b (therefore, the process may not be absolutely necessary depending on the format, and the fingerprint information which has been taken may be supplied directly to the minutiae extracting portion).

As a simple example, it shall be supposed that the fingerprint sampler 11 takes images at predetermined gradient levels, the minutiae extracting portion 21b discriminates minutiae by means of the ridges and grooves (two-value image), the control computation processing portion 21a divides each pixel in the fingerprint information into two values by filtering or the like to form two-value image data representing the ridge distribution of the sampled fingerprint (range of 1 cm$^2$ at the center portion) as only ridge portions and groove portions. Alternatively, the control computation processing portion 21a may supply the fingerprint information directly to the minutiae extracting portion, the minutiae extracting portion 21b then extracting the above-described eight types of minutiae (representing an image) from a fingerprint image as a mother wavelet by means of wavelet conversion.

When fingerprint information of an information format appropriate to minutiae extraction is supplied to the minutiae extracting portion 21b, the minutiae extracting portion 21b extracts the above-described eight types (i.e., starting point, end point, bifurcation point, juncture point, dot, short line, island and scar) of minutiae from the fingerprint information. Since an area of 1 cm² at the central portion of the fingerprint is sufficient to yield at least 12 minutiae (even in the case of those with few minutiae) as described above, at least 12 minutiae are extracted by the minutiae extracting portion 21b. The minutiae extracting portion 21b writes the types and positions of the extracted minutiae into the memory portion 22 as minutiae data. Here, the positions of the minutiae which are respectively written can, for example, be positional coordinates or pixel numbers in the image represented by the fingerprint information. As a result, minutiae data (type and position) are stored in the memory portion 22 for at least 12 minutiae in a 1 cm² range of the central portion of the fingerprint, thus registering the fingerprint taken by the press-type fingerprint sampler 1. With regard to the minutiae in the minutiae data, it is possible to include all of those which were extracted, or to preset the number of minutiae included to a constant number of at least 12.

(2) Fingerprint Matching

When matching fingerprints after registering the fingerprints as described above, an instruction to begin matching is inputted from the instruction input portion 20 at the fingerprint match processing device 2, and the person (hereinafter referred to as the "unidentified subject") who is to collate a registered fingerprint (hereinafter referred to as a "registered fingerprint") with his own fingerprint, as in the case of fingerprint registration as described above, enters the finger into the open portion of the fingerprint receiving member 10, and brings the fingerprint toward the receiving portion transparent panel 10a while aligning the base line of the nail and the center of the finger in the lateral direction respectively with the horizontal lines CL1 and CL2, and vertical lines VL1 and VL2.

As a result, the center of the fingerprint (hereinafter referred to as "unidentified fingerprint") of the unidentified subject is positioned at the center of the square mark SQM as described above, and the area of 1 cm² at the central portion of the unidentified fingerprint is precisely aligned with the position of the square mark SQM. Additionally, as in the above, the displacement of minutiae due to wrinkles and resilience of the finger and fingerprint are overcome, and the unidentified fingerprint pressed against the receiving portion transparent panel 10a is flatly spread so as to make the minutiae stand out. Then, an unidentified fingerprint which has been positioned and pressed against the receiving portion transparent panel 10a is read by the fingerprint reader 11 as described above, and when the fingerprint information of the taken fingerprint (the area of 1 cm² in the central portion of the unidentified fingerprint in the area of the square mark SQM) is supplied to the fingerprint match processing device 2, the supplied fingerprint information is taken into the control computation processing portion 21a of the information processing portion 21 which has received the input to give the instruction to start matching from the instruction input portion 20.

At this time, the control computation processing portion 21a supplies the collected fingerprint information to the minutiae extracting portion 21b as described above (after having processed it as needed), and the minutiae of the registered fingerprints stored in the memory portion 22 are read out, then supplied to the match computing portion 21c. At the minutiae extracting portion 21b which has received the fingerprint information from the control computation processing portion 21a, the eight types of minutiae are respectively extracted from the fingerprint information as in the above, as a result of which minutiae data (type and position of the minutiae in the area of 1 cm² at the central portion of the unidentified fingerprint) of the above-described unidentified fingerprint are obtained, but the minutiae extracting portion 21b does not write the minutiae data to the memory portion 22, and supplies them to the match computing portion 21c.

Then, at the match computing portion 21c, a fingerprint match computation is executed based on the supplied minutiae data. That is, the match computing portion 21c compares the minutiae data of the registered fingerprint received from the control computation processing portion 21a with the minutiae data of the unidentified fingerprint from the minutiae extracting portion 21b, to evaluate their degree of similarity (degree of similarity of the minutiae distribution between the registered fingerprint and the unidentified fingerprint). That is, a standard degree of similarity for which a fingerprint can be considered to be identical is predetermined, and if the degree of similarity exceeds this standard, the registered fingerprint and unidentified fingerprint are acknowledged to be the same.

Specifically, it is determined whether or not minutiae corresponding to the respective minutiae in the minutiae data of the registered fingerprint are present in the minutiae data of the unidentified fingerprint, to calculate the degree of similarity therebetween from the corresponding number of minutiae present and positional relationship (doseness) between the corresponding minutiae. For example, it is determined whether or not the same types of minutiae as the minutiae in the minutiae data of the registered fingerprint are present in the minutiae data of the unidentified fingerprint, and the distances between the positions of the same types of minutiae in the minutiae data of the registered fingerprint and the minutiae data of the unidentified fingerprint a are calculated. Then, if there are (at least) 12 minutiae of the same type common to both the minutiae data of the registered fingerprint and the minutiae data of the unidentified fingerprint, and if the distances between the positions of the respective twelve points in the registered fingerprint and the unidentified fingerprint are all equal to or less than a constant value, the unidentified fingerprint is judged to be the same as the registered fingerprint. On the other hand, if there are not at least 12 minutiae common to both, or if the above-described distances exceed the above-mentioned standard value, then the unidentified fingerprint is judged not to be the same as the registered fingerprint. The above-described standard value is preset as an error in the minutiae positions for which they can still be acknowledged to be the same.

Assuming that the unidentified subject is the same person who registered the fingerprint, the minutiae data of the registered fingerprint and the minutiae data of the unidentified fingerprint should both contain at least 12 types of minutiae in common. Additionally, in the present personal identification device, displacement can be controlled as described above so as to enable the fingerprint to be precisely sampled, so that the 12 points described above are extremely close with regard to the positions in the minutiae data of the registered fingerprint and in the minutiae data of the unidentified fingerprint. Therefore, in the match computation of the match computing portion 21c, the registered fingerprint and unidentified fingerprint are found to share (at least) 12 of the same types of minutiae, and the distances between their positions in the registered fingerprint and their positions in the unidentified fingerprint are found to be a standard value or less, as a result of which the unidentified fingerprint is determined to be the same fingerprint as the registered fingerprint. As a result, the information processing portion 21 (match computing portion 21c) issues a collation result which states that the unidentified fingerprint is the same as the registered fingerprint, in other words, that the unidentified subject is the same person as the one who originally registered the fingerprint.

On the other hand, assuming the unidentified subject is not the same person as the one who registered the fingerprint, the minutiae data of the unidentified fingerprint will not contain 12 or more minutiae corresponding to the minutiae in the minutiae data of the registered fingerprint, in accordance with the above-described theory which holds the necessary number of minutiae for a positive identification to be 12. Therefore, the match computation of the match computing portion 21c does not acknowledge that the registered fingerprint and unidentified fingerprint share (at least) 12 types of minutiae of the same type, or even if there are 12 of the same types of minutiae, their positions will not match, so that the distances between their positions in the registered fingerprint and their positions in the unidentified fingerprint will not be less than the above-described standard value. As a result, the information processing portion 21 issues a collation result that the unidentified fingerprint is not identical to the registered fingerprint, in other words, that the unidentified subject is not the same person as the one who registered the fingerprint.

The present personal identification device registers and matches fingerprints in the above manner, thereby discriminating whether or not an unidentified subject is the same person as the one who registered the fingerprint. Since the fingerprint used for this determination covers only a small area of 1 cm², only a small amount of data need be handled. Consequently, the amount of computation required for collation during the identification procedure is small, and personal identification can be performed in a small period of time. Additionally, the area of 1 cm² in the central portion of the fingerprint is an area which has been found through experiment and experience to contain enough minutiae to make positive unique identifications, and essentially differs from the fingerprint areas of the past which were employed to encompass as many minutiae as possible. In the present personal identification device, only a necessary and adequate standard area of the fingerprint is sampled, and the fingerprint can be sampled (read) readily at a position which is precisely defined with respect to the standard range, so that errors due to the amount of absolute positional displacement and errors due to the taking of an unnecessarily large area (minutiae extraction errors and displacement within the area) do not occur, while obtaining enough minutiae to make a positive identification. As a result, the precision of personal identification is improved over the case where minutiae are taken over a wide range, and precise personal identification can be easily performed.

The match results which are outputted from the information processing portion 21 as a result of the identification can be used in various ways. For example, the information processing portion 21 can be connected to display means or the like so as to display the personal identification results, or connected to audio output means such as a speaker so as to indicate the results of the personal identification by a tone. Alternatively, the information processing portion 21 can be connected to various types of control means such as keys or access controllers, so as to use the personal identification results for opening and closing locks or controlling access (specific examples of such use shall be described below).

Applications/Modifications

Next, personal identification due to various formats applying or modifying the above-described personal identification device of the basic structure shall be described.

A. Registration of Dermatoglyphs of a Plurality of Locations and Their Matching

Fingerprints are portions of the body which all individuals always carry with them, without every forgetting or losing them. Moreover, each individual's fingerprint is absolutely unique in the world and capable of positively identifying that person As such, in order to identify the same person by means of fingerprint matching, it is theoretically sufficient to register a single fingerprint for each person. However, in actuality, there is the risk of the registered finger being copied, a fake finger being duplicated with that fingerprint, and used to obtain an unauthorized match (there are cases in which fake fingers are made out of gelatin or the like using other people's registered fingerprints). Additionally, in extreme cases, the finger of the one who registered the fingerprint may actually be severed for such illicit use.

Therefore, as an example of application of the above-described personal identification device, the dermatoglyphs of a plurality of locations on an individual's body including the fingerprint can be registered, and the registrant may freely select the combination of the plurality of dermatoglyphs to be registered as well as the registered order of the dermatoglyphs (the dermatoglyphs registered by the registrant can be arbitrarily selected and the registered order arbitrarily decided). Then, during the matching procedure, the dermatoglyphs to be matched with the sequentially sampled dermatoglyphs must be presented in the order of registration, with the order of registration of the plurality of dermatoglyphs then functioning as a kind of pass code for the registrant.

Figure 7:
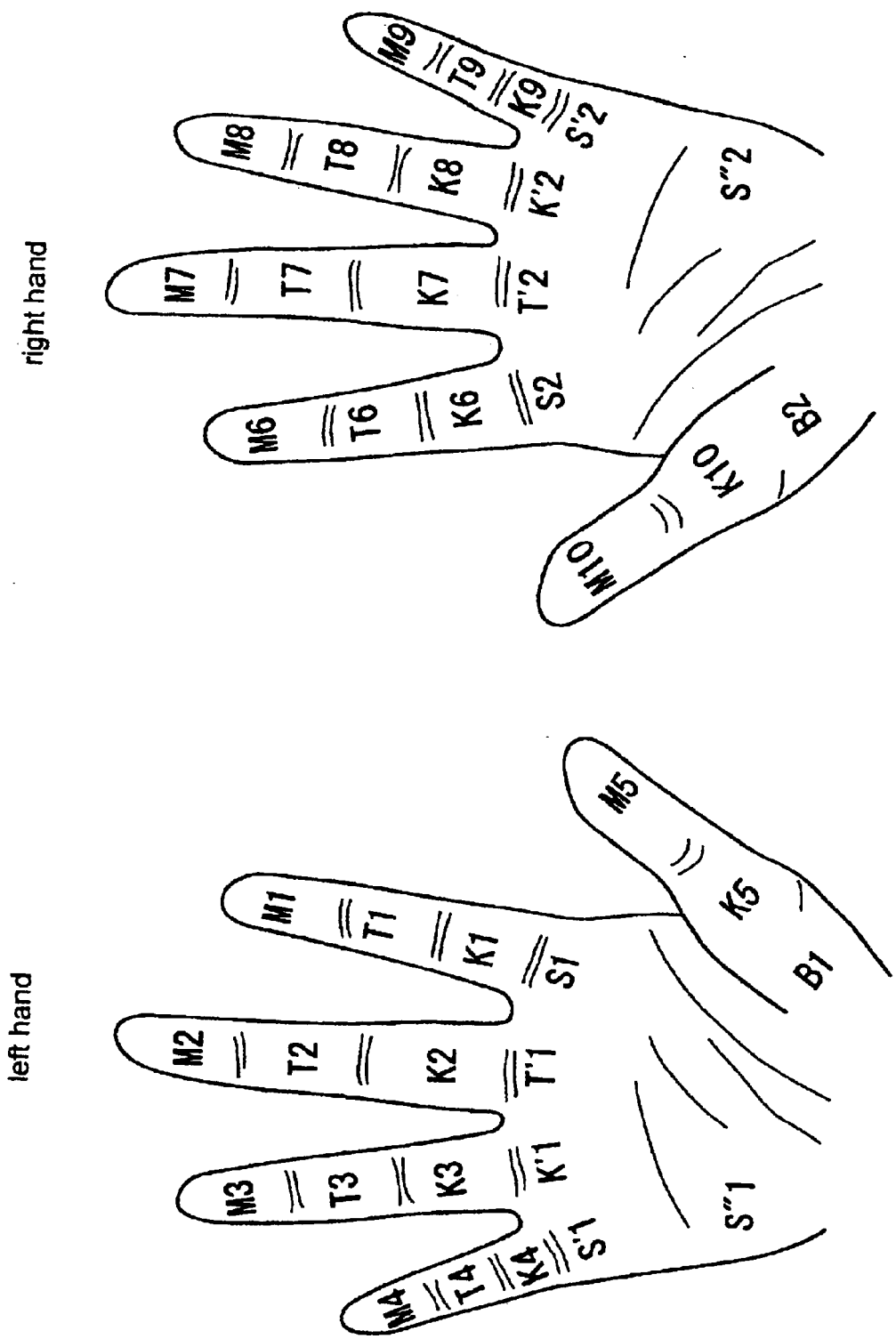
FIG. 7 is a diagram showing the various parts of the hands having prints.
Figure 8:
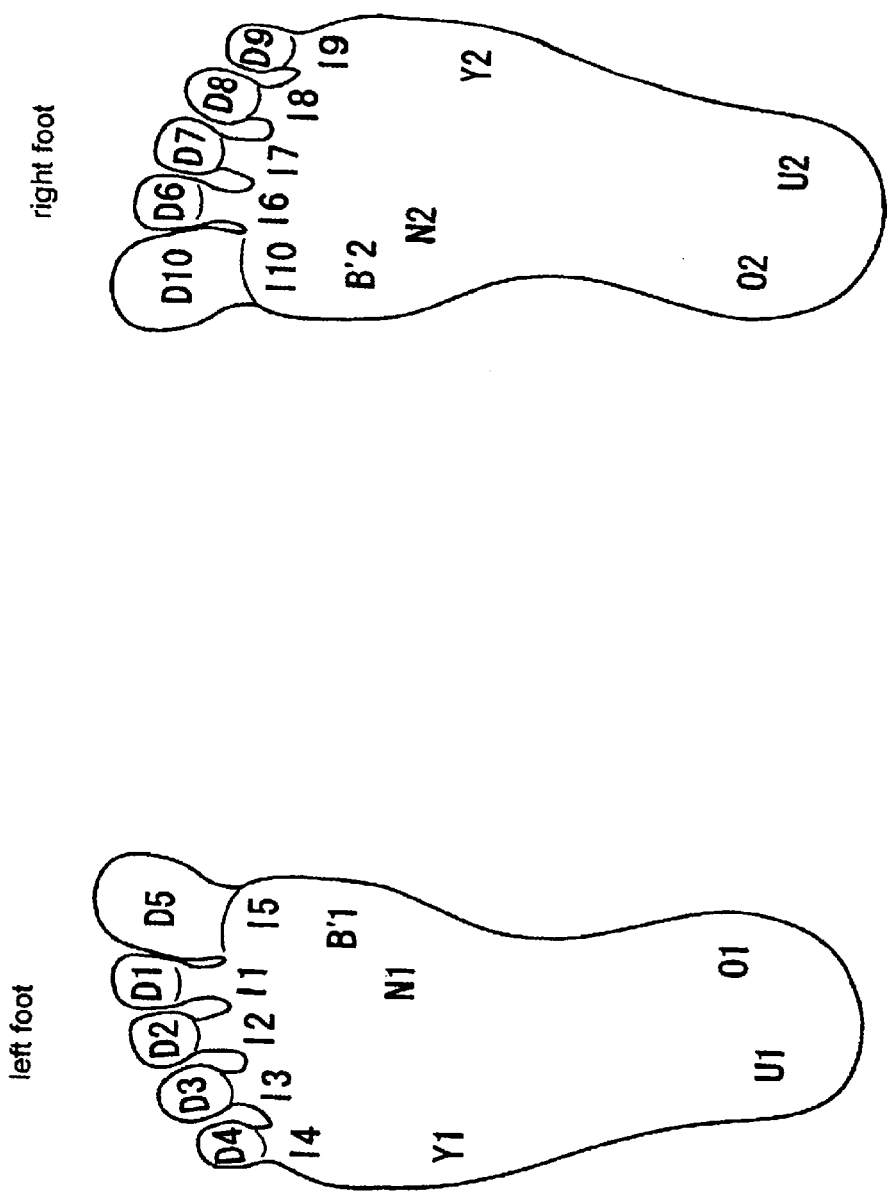
FIG. 8 is a diagram showing the various parts of the feet having prints.

As the dermatoglyphs mentioned here, various locations on the palm of the hand as indicated by the references in FIG. 7 and various locations on the sole of the foot as indicated by the references in FIG. 8 can be used. In these drawings, the locations (their names) indicated by the references are as follows (it should be noted, however, that in FIGS. 7 and 8, the palm and sole are shown as a linear projection, so that they actually have their right and left sides reversed with respect to their actual orientations):

(a) Portions of Palm Print (FIG. 7)

M1, M2, M3, M4, M5—Distal phalanx of fingers of left hand (fingerprints).

T1, T2, T3, T4—Medial phalanx of fingers of left hand excluding thumb.

K1, K2, K3, K4, K5—Proximal phalanx of fingers of left hand.

S1—Pad at base of left index finger.

T'1—Pad at base of left middle finger.

K'1—Pad at base of left ring finger.

S'1—Pad at base of left little finger.

S"1—Ball below left little finger.

B1—Ball below left thumb.

M6, M7, M8, M9, M10—Distal phalanx of fingers of right hand (fingerprints).

T6, T7, T8, T9—Medial phalanx of fingers of right hand excluding thumb.

K6, K7, K8, K9, K10—Proximal phalanx of fingers of right hand.

S2—Pad at base of right index finger.

T'2—Pad at base of right middle finger.

K'2—Pad at base of right ring finger.

S'2—Pad at base of right little finger.

S"2—Ball below right little finger.

B2—Ball below right thumb.

(b) Portions of Sole Print (FIG. 8)

D1, D2, D3, D4, D5—Second toe, third toe, fourth toe, fifth toe and first toe (big toe) of left foot.

I1, I2, I3, I4, I5—Pad at base of second toe, pad at base of third toe, pad at base of fourth toe, pad at base of fifth toe and pad at base of first toe of left foot.

B'1—Ball under big toe of left foot.

N1—Y-shaped line on left foot.

Y1—Ball under little toe of left foot.

O1—Heel print of left foot.

U1—Heel portion of left foot.

D6, D7, D8, D9, D10—Second toe, third toe, fourth toe, fifth toe and first toe (big toe) of right foot.

I6, I7, I8, I9, I10—Pad at base of second toe, pad at base of third toe, pad at base of fourth toe, pad at base of fifth toe and pad at base of first toe of right foot.

B'2—Ball under big toe of right foot.

N2—Y-shaped line on right foot.

Y2—Ball under little toe of right foot.

O2—Heel print of right foot.

U2—Heel portion of right foot.

As described above, humans have fingerprints on all 10 fingers, and have 30 more locations between each joint and on the palm with prints, so that there are at least 40 parts from which dermatoglyphs ca be taken on the hands alone. Additionally, with regard to the soles of the feet, there are a total of 30 places such as the toes from which dermatoglyphs can be taken. This total of 70 locations have individual prints with absolutely unique features, such that not even portions on the same individual's body ever have identical prints, and there is no right-left symmetry. Therefore, it is possible to identify whether or not a person is the same individual by matching the dermatoglyphs at any of the above-described 70 locations, the dermatoglyphs of the above-described 70 locations, whether or not they are fingerprints, having absolutely the same value as personal identification information, and being naturally suited to use for personal identification. The phalanx, the pads at the base portions of the fingers, the palm, and the ball portions all have ridges just as in fingerprints, each of these portions also having 50–100 minutiae (in an area of 2 $cm^2$, for example), so that as in the case of fingerprints described above, it is possible to extract at least 12 minutiae by sampling an area 1 $cm^2$ in the central portion. As the central portion of the part in this case, the central position corresponding to the central portion of the fingerprint can be appropriately determined from the shape of each part and its position on the body.

In order to register a plurality of areas selected from the above-described 70 (uniquely identifiable) dermatoglyphs, in a personal identification device with the structure shown in FIG. 1, an instruction input portion enabling input of such an instruction is used as the instruction input portion 20, with an information processing portion and memory portion capable of handling a plurality of dermatoglyph registration procedures being used as the information processing portion 21 and memory portion 22. That is, an instruction is inputted from the instruction input portion 20 for registering the dermatoglyphs in a plurality of locations. The information processing portion 21, upon receiving this, sequentially writes and registers the dermatoglyphs of the plurality of locations sampled by the press-type fingerprint sampler 1 (a plurality of dermatoglyphs covering an area of 1 $cm^2$ in the center of each location). For example, after inputting an instruction to begin registration once, the operation of sampling the print at the press-type fingerprint sampler 1 to writing the minutiae data to the memory portion 22 can be repeated (while arbitrarily selecting and changing the sampled dermatoglyph) to write the dermatoglyphs of the plurality of locations into the memory portion in the order of sampling. As a result, the dermatoglyphs of the plurality of portions have their minutiae extracted and are registered in order.

Figure 9:
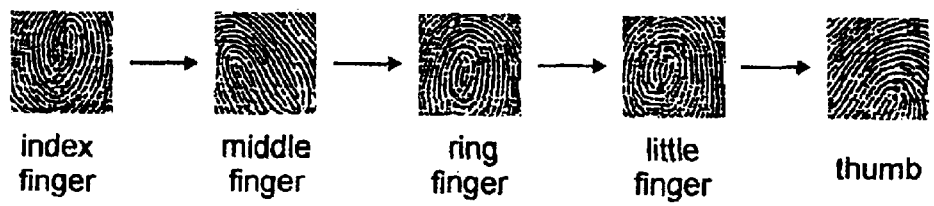
FIG. 9 is a diagram showing an example of a plurality of sampled fingerprints for the case where dermatoglyphs of a plurality of locations are registered.

For example, when registering fingerprints in the order of the distal phalange of the index finger, the distal phalange of the middle finger, the distal phalange of the ring finger, the distal phalange of the little finger and the distal phalange of the thumb, the index finger, middle finger, ring finger, little finger and thumb are placed in that order in the open portion of the fingerprint receiving member 10 as described above, their fingerprints being sequentially read by the fingerprint reader 11. Then, as shown in FIG. 9, the fingerprint of each finger is sampled in the order indicated by the arrows in the drawings, and minutiae are extracted from the fingerprint information of the respective fingerprints by the minutiae extracting portion 21*b* of the information processing portion 21, in the same manner as described above, after which the minutiae data are written into the memory portion 22. As a result, the memory portion 22 is registered with the respective fingerprints such that the distal phalange of the index finger is taken as the first registered fingerprint, the distal phalange of the middle finger is taken as the second registered fingerprint, the distal phalange of the ring finger is taken as the third registered fingerprint, the distal phalange of the little finger is taken as the fourth fingerprint and the distal phalange of the thumb is taken as the fifth registered fingerprint.

Then, when performing the match, after the instruction to start the match has been entered, the unidentified subject presents his own dermatoglyphs at the press-type fingerprint sampler 1 in the same order as when sampling the fingerprint for registration. At this time, the fingerprint match processing device 2 extracts minutiae data from the dermatoglyphs of the plurality of locations supplied from the press-type fingerprint sampler 1 while making the supplied order correspond to the order of registration of the dermatoglyphs registered in the memory portion 22 and performs a match computation for the minutiae data of the dermatoglyphs in the corresponding order of registration in the same manner as above. As a result, the information processing portion 21 outputs a match result for notifying that the unidentified subject is the same as the one who registered the fingerprints only upon finding that the dermatoglyphs of the plurality of locations supplied from the press-type fingerprint sampler 1 and the dermatoglyphs of the plurality of locations which have been registered are all identical (if the dermatoglyphs are matched in the order in which they are supplied, and the respective dermatoglyphs are found to be the same as those which have been registered).

For example, when the fingerprints of FIG. 9 have been registered and the registrant is to have the fingerprints read as an unidentified subject, the unidentified subject enters fingers in the open portion of the fingerprint receiving member 10 in the same order as during registration, that is, in the order of the index finger, middle finger, ring finger, little finger and thumb, whereby the fingerprint reader 11 reads the fingerprints in that order. Then, the fingerprint information is supplied to the fingerprint match processing device 2 in the order of the distal phalange of the index finger, the distal phalange of the middle finger, the distal phalange of the ring finger, the distal phalange of the little finger and the distal phalange of the thumb, and at the fingerprint match processing device 2, a matching computation is performed for comparing the minutiae data in the order of the distal phalange of the index finger against the first registered fingerprint, the distal phalange of the middle finger against the second registered fingerprint, the distal phalange of the ring finger against the third registered fingerprint, the distal phalange of the little finger against the fourth registered fingerprint, and the distal phalange of the thumb against the fifth registered fingerprint. In this case, the order of the unidentified fingerprints and the order of the registered fingerprints correctly correspond (match), and since the unidentified subject is the same individual who registered, the types and positions of the minutiae also match, so that all of the supplied plurality of unidentified fingerprints and plurality of registered fingerprints are judged to be the same. Consequently, the information processing portion 21 (match computing portion 21c) outputs a match result which notifies that the unidentified subject is the same individual who registered the fingerprint (who freely selected and registered the plurality of fingerprints).

In contrast, if all of the registered dermatoglyphs are not sampled, or all of the registered dermatoglyphs have not been sampled but their sampling order is different from the order of registration, the sampled dermatoglyphs cannot be acknowledged to be identical to the plurality of registered dermatoglyphs, and a result notifying that the unidentified subject is not the same individual who registered is outputted (a match result notifying that they are the same person is not outputted). Therefore, if for example, the fingerprints of FIG. 9 have been registered, even if a portion or all of the distal phalange of the index finger, distal phalange of the middle finger, the distal phalange of the ring finger, distal phalange of the little finger and distal phalange of the thumb as shown in the drawing are prepared (if a third party copies them and makes duplicates, or has severed the fingers from the registrant), a result cannot be obtained to the effect that they are the same person unless the order of registration of the parts is known.

In this way, due to the registrant arbitrarily registering a plurality of freely selected dermatoglyphs from the seventy mentioned above, the order of registration can act as a pass code if this order of registration is kept secret. That is, the knowledge of which fingers (dermatoglyphs) to choose and in which order to present them can be used as a pass code which only the subject knows. As a result, the function of a pass code can be expected of the order of registration, and by making use of the order of registration as a pass code, the personal registration can be performed in an encoded manner. Thus, even if the dermatoglyph is duplicated, a third party will not be able to obtain a result acknowledging him to be the same individual as the one who registered, unless information as to the order of registration is also obtained.

In this example, the number of variations on the order of registration of dermatoglyphs and combination of dermatoglyphs selected, even when allowing only the ten fingers to be registered, is $10^2=100$ for two fingers, $10^3=1000$ for three fingers and $10^{10}=10$ billion for all ten fingers. Additionally if the 40 locations on the hands alone are used as possible areas of registration of dermatoglyphs, the number of possible combinations of order of registration of dermatoglyphs and selection of dermatoglyphs becomes astronomical, and if all 70 of the locations described above are used as possible subjects for dermatoglyphs, the number will become even larger. Consequently, the locations which are registrable and the number of dermatoglyphs used can be appropriately determined depending on the level of security for personal identification required for each situation, and can be made to handle even cases where extremely strict personal identification is required, such as for keys having extremely tight security standards.

Additionally, by arbitrarily selecting the dermatoglyphs which are registered and arbitrarily deciding the order of registration, the level of security is increased, and with the addition of a code, the three locations of the distal phalange, medial phalange and proximal phalange can be used as prints even on the same finger, so that the registered content can be made more complex and difficult to decode even by simply changing their combination. For example, if the six portions of the two fingers are used randomly for encoding, decoding will become extremely difficult.

B. Information Registration Formats of Memory Portion (1) Registration of a Plurality of People In the above-described personal identification device, it is possible to pre-register the fingerprints of a plurality of people (in the case of part A described above, the dermatoglyphs of a plurality of parts of each of the plurality of people), and personal identification is performed with respect to each of the plurality. In the case where this type of personal identification is to be performed, when registering the fingerprint of each registrant, predetermined information such as a pass code for specifying the registrant is inputted from the instruction input portion 20, and the information is added to the minutiae data of the registrants and registered by the control computation processing portion 21a (it is written into the memory portion 22 as a header or the like of minutiae data of the registrants). Then, during the match procedure, the information is inputted by an unidentified subject, and based thereon, the control computation processing portion 21a reads the minutiae data of the registered fingerprint which the unidentified subject wishes to match from the memory portion 22 and supplies this to the match computing portion 21c.

Alternatively, the information for specifying the registrant may be left unregistered. In this case, during the match procedure, the information processing portion 21 may collate the unidentified fingerprint with each of the registered fingerprints as described above, and can output a match result in the event that the unidentified fingerprint is found to be identical to any of the registered fingerprints.

(2) Use of Fingerprint Information

In the above-described personal identification device, the minutiae extracting portion 21b writes the minutiae data into the memory portion 22, but in addition thereto, the control computation processing portion 21a may write the fingerprint information itself into the memory portion 22 or output it to an external location. Since the fingerprint information itself is information representing an image of 1 $cm^2$ at the central portion of the sampled fingerprint, if the fingerprint information of each of the sampled fingerprints are stored and outputted to an external location in response to an instruction or the like from the instruction input portion 20 (or sampled and outputted directly to the external location), then the image of the sampled fingerprint can be used in various forms.

For example, in the above-described personal identification device, the sampled fingerprint is restricted to a range of 1 $cm^2$ in the central portion of the fingerprint, so that the match procedure can be readily performed by a mechanical computation process as described above, this being the same for the case where the comparison is made by eye. That is, by making use of the image of the 1 $cm^2$ area in the central portion of the fingerprint acquired by the personal identification device described above, the match can also be readily confirmed by eye. Specifically, the image expressed by the fingerprint information can be displayed on display means or the like, outputted to printing means, and enlarged if needed in order to make it possible to perform a match with the naked eye. This type of format is extremely convenient as a method for matching fingerprints, not requiring the use of any complicated equipment and thereby enabling personal identification at a low cost.

Additionally, such naked eye collations can be performed not only with respect to fingerprints, but also to other types of dermatoglyphs as described above, using the dermatoglyph information represented by their images, thus enabling personal identification by means of a convenient process and at low cost.

In the event that dermatoglyph information (dermatoglyph information of each part including the above-described fingerprint information) itself is to be used, then it is convenient to provide a code representing each part from which a dermatoglyph can be taken. For example, the reference for each part shown in FIGS. 7 and 8 can be assigned to each part as a code, and when writing images to the memory portion 22 or outputting them to an external location, these codes can be used to classify the dermatoglyph information. As a result, for example, when inputting the dermatoglyph information into an information processing portion 21 such as a computer, the information processing can be simplified by adding the corresponding code as a header or the like, so as to append "M1" if the information is fingerprint information for the left index finger (dermatoglyph information of the distal phalange portion of the index finger of the left hand), "T1" if the information is dermatoglyph information of the medial phalange portion of the index finger of the left hand, "K1" if the information is dermatoglyph information of the proximal phalange portion of the index finger of the left hand, and "T2" if the information is dermatoglyph information of the medial phalange portion of the middle finger of the right hand.

Here, the appending of the code can be performed by the control computation processing portion 21a in accordance with instructions from the instruction input portion 20, and the control computation processing portion 21a may be given the capability of changing, deleting or adding the information stored in the memory portion 22 in response to instructions from the instruction input portion 20. When performing a match, for example, the appended codes can be used to call up images of desired dermatoglyphs by means of instructions from the instruction input portion 20, and by sliding the image across the screen of the display means to collate the minutiae, the two can be acknowledged as being the same when at least 12 minutiae match between the unidentified dermatoglyph and the registered dermatoglyph.

C. Modification of Press-type Fingerprint Reader (1) Imaging Format

As described above, the press-type fingerprint reader 1 of the fingerprint receiving member 10 flattens the fingerprint by pressing it against a transparent material (receiving portion transparent panel 10a) having a flat surface, so that the flattened fingerprint can then be captured as a two-dimensional image from the opposite side through the transparent material. For this reason, a two-dimensional image of the fingerprint can be readily taken in almost any type of image format, so that the fingerprint can be sampled using not only a CCD camera, but also image fibers and other types of optical sensors.

Figure 10:
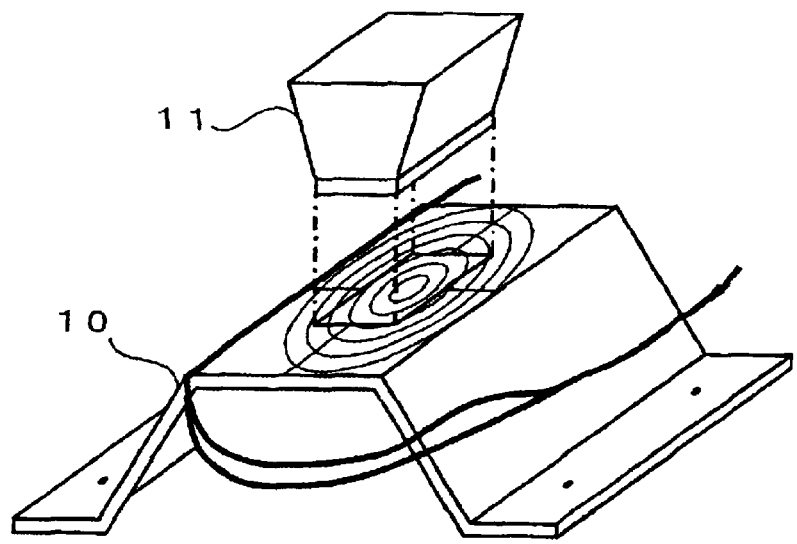
FIG. 10 is a diagram showing a fingerprint sampling arrangement for the press type fingerprint sampler 1 differing from that of FIG. 5.

Additionally, the vertical arrangement of the fingerprint receiving member 10 and fingerprint reader 11 shown in FIG. 3 can be reversed so as to take the image of the fingerprint in the form shown in FIG. 10. In this case, the finger is pushed upward and entered into the open portion of the fingerprint receiving member 10, and the area of 1 cm² in the central portion of the fingerprint pressed against the receiving portion transparent panel 10a is read from above by the fingerprint reader 11 as shown in the drawing.

(2) Planar Fingerprint Receiving Member

Figure 11:
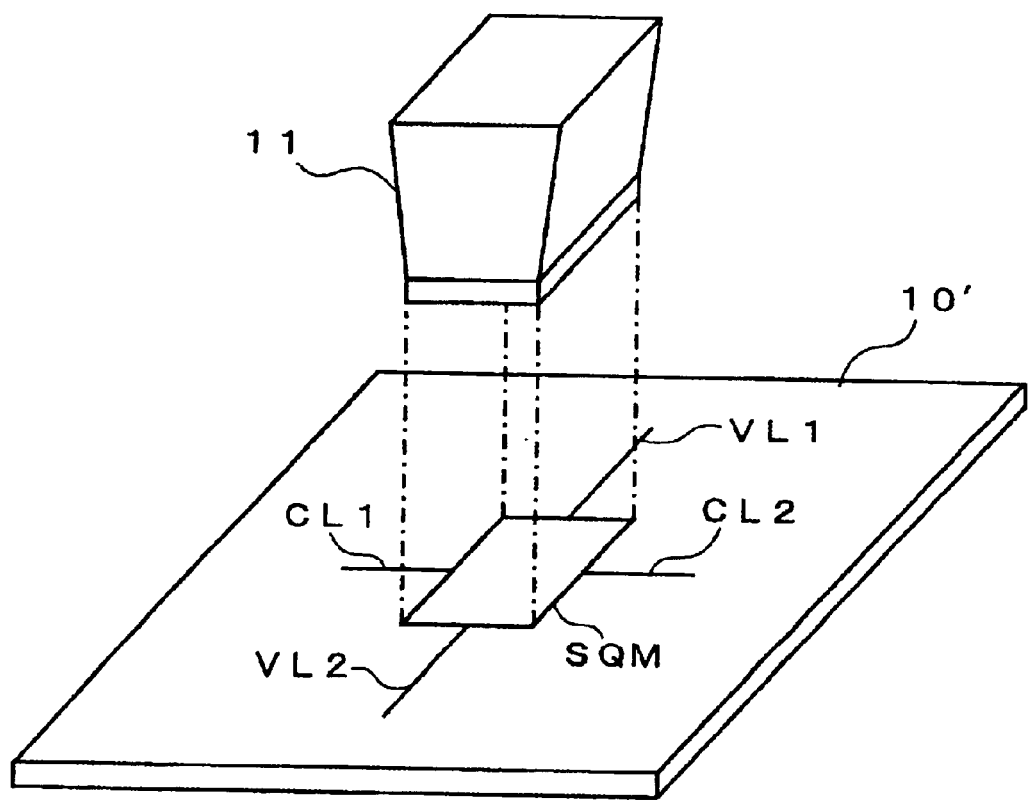
FIG. 11 is a diagram showing another example of a pres type fingerprint (dermatoglyph) sampler aside from the press type fingerprint sampler 1 of FIG. 3.

With regard to the various locations on the palm and locations on the soles of the feet as described above, it is possible to use a press-type fingerprint (dermatoglyph) sampler composed of a planar receiving member 10' as shown in FIG. 11 instead of the press-type fingerprint sampler 1 of FIG. 3. The receiving member 10' of FIG. 11 is also composed of a transparent material such as a transparent acrylic panel, has a perceptible square mark SQM having an area of 1 cm² in the center, and is made to receive the central portions of the dermatoglyphs of the phalanx, pads or ball portions by pressing them against the square mark SQM. Additionally, as with the above-described fingerprint receiving member 10, vertical lines VL1, VL2 and horizontal lines CL1, CL2 are drawn visibly outward from the midpoints of the four sides of the square mark SQM, thus enabling the central portion of the dermatoglyph.

Here, the receiving member 10' is used especially for sampling dermatoglyphs of the pad portions or ball portions. The two-dimensional image of the dermatoglyph which has been pressed against the panel and appeared in the area of the square mark SQM is sampled by reading with the fingerprint reader 11 as in the case of the press-type fingerprint sampler 1 described above.

(3) Handling Different Finger Sizes

While the open portion of the above-described fingerprint receiving ember 10 must be sized to fit the fingers whose fingerprints are to be sampled, fingers come in various sizes (thicknesses), so that particularly in the case where the fingerprints of a plurality of people are to be sampled and registered, it may not be appropriate to use only a single fingerprint receiving member 10. Therefore, the fingerprint receiving member 10 may, for example, comprise in addition to one which is fitted to the size of an average finger (with the lateral width of the open portion fitted to the average thickness of a finger), a plurality of others of smaller and larger sizes (with open portions of different widths). Then, the fingerprint receiving member 10 can be made detachable with respect to the press-type fingerprint sampler, so as to enable use of a fingerprint receiving member 10 which is fit to a suitable size for the size of the finger whose fingerprint is to be sampled.

However, when using a plurality of fingerprint receiving members 10 in this way, the same fingerprint receiving member 10 must be used for registration and matching, so that information as to which fingerprint receiving member 10 was used to read the fingerprint must be recorded. For example, each fingerprint receiving member 10 can be pre-assigned a specific identification number, the identification number of the fingerprint receiving member 10 used for registration stored along with the registration, and the fingerprint receiving member 10 corresponding to the registered identification number used for the match. By also registering the identification number of the fingerprint receiving member 10 at the same time, it is possible to more readily manage the information when using a plurality of fingerprint receiving members 10.

D. Handling Emergencies

Fingerprints can at times become unusable as personal identification information if damaged or lost due to injury or burns. For example, workers in certain fields such as stone masons or those handling cement can have the ridges of their fingerprints wear away over time, thus making the minutiae difficult to ascertain. Additionally, even those who work in the household can sometimes developed rough hands due to the continual use of strong cleansers or the like, in which case the ridges of the fingerprints can similarly wear away and become unclear. Furthermore, injuries can also cause temporary accidental fingerprints (fingerprints which have temporarily changed due to injury or wear).

In order to be able to handle such emergencies in which the fingerprints can no longer be used as personal identification information, a plurality of dermatoglyphs can be separately registered beforehand, and any one among these registered dermatoglyphs used for the normal match process, the other dermatoglyphs being reserved for use in the case of an emergency. For example, in the above-described personal identification device, two fingerprints can be separately registered, either one of the fingerprints being used for normal matching, and the other fingerprint being used for matching in emergencies. Alternatively, when registering a plurality of dermatoglyphs with the order of registration as the pass code, two combinations of the plurality of dermatoglyphs and order of registration can be selected and registered. Then, one of these combinations of dermatoglyphs and order of registration can be used for normal matching, the other being reserved for use in emergencies.

By pre-registering a plurality of dermatoglyphs or a plurality of possible combinations thereof, any one of them can be used as the normal code key, and the other used as a master key. Here, since humans have at least 40 portions which can be used for personal identification on the hands alone, their use alone can greatly expand the range of selection of registration in the case of emergencies, enabling strict and safe emergency measures to be achieved as in the personal identification described above.

E. Increased Security Against Duplications

In order to combat cases in which fake fingers are made by copying registered fingerprints or the finger with the registered fingerprint is severed for illicit use, a third party can be prevented from being identified as the registrant by registering the dermatoglyphs of a plurality of locations and using the order of registration as the pass code, but it is also possible to provide means for eliminating fake fingers.

For example, a valid finger (dermatoglyph) is a part of the body of the registrant, and as such must have blood flow, blood pressure and body heat. Fake fingers and severed fingers do not have such properties. Therefore, a sensor for sensing blood flow, blood pressure, body temperature or pulse may be built into a predetermined location of the personal identification device such as in the location of installation of the press type fingerprint sampler 1, and the sensed results of this sensor can be used to judge whether or not the subject of the match is a valid finger. By using predetermined sensing means such as a sensor in this way, the security of the match procedure becomes higher, thereby reliably preventing unauthorized use by means of fake fingers or severed fingers.

F. Examples of Application

Dermatoglyphs such as fingerprints can be used in a variety of fields, including use as alternatives for keys to buildings such as residences and offices, or keys to vehicles, as well as use for personal verification for passports or cards such as cash cards, credit cards and debit cards. In the case where fingerprints are used for various fields in this way, additional information can be registered along with the fingerprints as needed, or additional device structures added according to the form of use of the fingerprints.

As appropriate applications for personal identification using fingerprints and the like, there are systems relating to the storage of properties such as valuable articles or money, as well as life support systems for medical use and the like. While bar codes are often employed to identify patients at medical facilities, the reliability of patient identification will rise if fingerprints are used. Additionally, by using fingerprints for personal identification in administrative procedures, the procedures can be made to be performed more smoothly and conveniently. For example, if fingerprints are registered and matched for procedures relating to the reissue of lost passports, the personal identification can be performed in a reasonable manner and the procedures streamlined as a result. Aside from these applications, dermatoglyphs such as fingerprints can be used in many other applications, such as for identifying victims of disasters or the like, as means for screening passage into or out of restricted areas, or for preventing the theft of vehicles and the like. While the above-described personal identification device can be used for a variety of applications using fingerprints or the like, a few of the possibilities shall be given below as specific examples.

(1) Medicine

For example, the fingerprint can be registered as additional information along with the content of clinical records, and used for personal identification and information management of patients.

(2) Passport

When applying for a passport, the fingerprint can be submitted along with the documents which are currently required, and the fingerprint registered as personal identification information of that applicant. The registered fingerprint can then be used during reissue procedures or the like to identify the applicant as being the same individual.

(3) Disaster Control

This can be developed from the same format as used for medical applications as described above, or developed from the same format as used for passports as described above, and therefore may have a different structure according to the basic arrangement, but both cases include situations in which personal identification of victims will be necessary, so that fingerprints can be added as information provided for personal identification of disaster victims.

(4) Locking/Unlocking of Keys, Access Control

The opening and closing of locks, access to facilities and use of cards for entry can be controlled based on the results of personal identification. For example, the key for the entrance provided in a common residential building or some other such building can be controlled electronically, and the electrical control performed based on the results of personal identification by fingerprints as described above. In this case, the additional personal information will not be often required, but a key may be used to perform the function of an ID card.

(5) Preventing Theft of Vehicles

The lock of a vehicle can be made electronic or magnetic, the fingerprint transferred to metal for use in matching procedures, and the locking or unlocking controlled according to the results of the match. By locking or unlocking a vehicle not by using a mechanical key, but the fingerprint alone, the theft of the vehicle can be prevented.

With regard to these applications, it is especially suitable to use the registration and matching of a plurality of dermatoglyphs in cases where strictly positive identification is required, such as in the case of clinical records, reissuing of passports and changing fingerprints or the like registered as a key.

What is claimed is:

1. A personal identification device comprising:
   sampling means for sampling a dermatoglyph over a predetermined standard range containing a number of minutiae necessary to uniquely identify an individual;

extracting means for extracting minutiae from the dermatoglyphs sampled by said sampling means;

memory means for recording minutiae information extracted by said extracting means for a registrant whose dermatoglyph has been previously sampled and registered by said sampling means; and determining means for determining whether or not the dermatoglyph of said registrant is the same as the dermatoglyph of an unidentified subject by comparing minutiae information extracted by said extracting means from the dermatoglyph of the unidentified subject sampled by said sampling means and the minutiae information recorded by said memory means;

wherein said unidentified subject is identified as being the same individual as said registrant when the dermatoglyph of said registrant and the dermatoglyph of said unidentified subject are found to be the same by said determining means;

wherein said sampling means comprises:

image taking means for acquiring an image of dermatoglyph; and fixing means for fixing the position of said standard range fo the dermatoglyph in an image acquiring area of said image acquiring means; and wherein said fixing means comprises an ex-dermatoglyphic member for pulling the skin outside said standard range of the dermatoglyph, thereby exposing the flatly extended dermatoglyph more clearly to said image taking means.

2. A personal identification device comprising:

sampling means for sampling a dermatoglyph over a predetermined standard range containing a number of minutiae necessary to uniquely identify an individual;

extracting means for extracting minutiae from the dermatoglyphs sampled by said sampling means;

memory means for recording minutiae information of dermatoglyphs of a plurality of locations extracted by said extracting means from a registrant who has sequentially sampled and registered dermatoglyphs of said plurality of locations by said sampling means; and determining means for comparing the minutiae information extracted by said extracting means from the dermatoglyphs of an unidentified subject sampled by said sampling means and minutiae information stored in said memory means, and determining whether or not the dermatoglyphs of said registrant are the same as the dermatoglyphs of said unidentified subject, wherein the minutiae information extracted from the dermatoglyphs sequentially presented by said unidentified subject are compared with minutiae information of the dermatoglyphs of said registrant sampled by said sampling means read out from said memory means in the same order as the dermatoglyphs are presented;

wherein said unidentified subject is identified as being the same individual as said registrant when the dermatoglyphs sequentially presented by said registrant and the dermatoglyphs sequentially presented by said unidentified subject are found to be the same by said determining means;

wherein said sampling means comprises:

image taking means for acquiring an image of a dermatoglyph; and fixing means for fixing the position of said standard range of the dermatoglyph in a image acquiring area of said image acquiring means; and wherein said fixing means comprises an ex-dermatoglyphic member for pulling the skin outside said standard range of the dermatoglyph, thereby exposing the flatly extended dermatoglyph more clearly to said image taking means.

* * * * *

UNITED STATES PATENT AND TRADEMARK OFFICE
CERTIFICATE OF CORRECTION

PATENT NO. : 6,929,180 B2
DATED : August 16, 2005
INVENTOR(S) : Tsukamoto et al.

It is certified that error appears in the above-identified patent and that said Letters Patent is hereby corrected as shown below:

Column 23,
Line 24, delete "fo" and insert -- of --.

Signed and Sealed this

Twenty-first Day of March, 2006

JON W. DUDAS
*Director of the United States Patent and Trademark Office*